United States Patent
Chervu

(10) Patent No.: US 11,260,801 B2
(45) Date of Patent: Mar. 1, 2022

(54) VEHICLE ROOF RAIL ASSEMBLY

(71) Applicant: Nissan North America, Inc., Franklin, TN (US)

(72) Inventor: Raghu Chervu, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 11 days.

(21) Appl. No.: 16/255,096

(22) Filed: Jan. 23, 2019

(65) Prior Publication Data

US 2020/0231095 A1    Jul. 23, 2020

(51) Int. Cl.
*B60R 9/052* (2006.01)
*B60R 13/04* (2006.01)

(52) U.S. Cl.
CPC .............. *B60R 9/052* (2013.01); *B60R 13/04* (2013.01)

(58) Field of Classification Search
CPC ........... B60R 13/04; B60R 9/052; B60R 9/05; B60R 9/045; B60R 9/048; B60R 9/058; B60R 9/04; B60R 13/06; B60R 9/08; B60P 7/0807
USPC ................ 224/322, 455, 460, 534, 568, 329
See application file for complete search history.

(56) References Cited

U.S. PATENT DOCUMENTS

| | | | | |
|---|---|---|---|---|
| 4,270,681 A * | 6/1981 | Ingram | ................... | B60R 9/045 224/321 |
| 4,274,570 A * | 6/1981 | Bott | ....................... | B60R 9/045 224/324 |
| 4,372,469 A * | 2/1983 | Kowalski | ................ | B60R 9/045 224/321 |
| 5,636,776 A * | 6/1997 | Rak | ......................... | B60R 9/045 224/309 |
| 6,497,350 B1 * | 12/2002 | Hickey | .................. | B60R 9/058 224/329 |
| 8,567,838 B2 | 10/2013 | Coakley et al. | | |
| 8,641,118 B2 | 2/2014 | Coakley et al. | | |
| 8,646,834 B2 | 2/2014 | Coakley et al. | | |
| 8,979,181 B2 * | 3/2015 | Slack | ...................... | B60R 13/04 296/210 |

FOREIGN PATENT DOCUMENTS

DE          10019216 A1 * 10/2000 ............. B60R 9/058

* cited by examiner

*Primary Examiner* — Nathan J Newhouse
*Assistant Examiner* — Matthew T. Theis
(74) *Attorney, Agent, or Firm* — Global IP Counselors, LLP

(57) ABSTRACT

A vehicle roof rail assembly includes a roof rail and a bracket. The roof rail is fixedly attached to the roof of a vehicle. The roof rail has a recessed portion with fastener receiving portions located therein. The bracket has an attachment flange and an accessory supporting flange rigidly fixedly attached to the attachment flange. The attachment flange is removably attached to the roof rail via first fastener members that are removably fixed to the fastener receiving portions. The attachment flange overlays a section of the recessed portion the roof rail. The accessory supporting flange has an opening defined therein for attachment of roof accessory retaining elements.

16 Claims, 7 Drawing Sheets

VEHICLE ROOF RAIL ASSEMBLY

BACKGROUND

Field of the Invention

The present invention generally relates to a vehicle roof rail assembly. More specifically, the present invention relates to a vehicle roof rail assembly mounted flush with or slightly extending above a vehicle roof surface the vehicle roof rail assembly including removable covers that conceal roof accessory supporting structures configured to support, for example, roof rack members or a cartop carrier.

Background Information

Many vehicles, such as SUVs (sports utility vehicles) include conventional roof rails. Conventional roof rails typically include rod-like members with spaced apart downwardly extending attachment projections that attached to a vehicle roof structure. Between the attachment projections, the rod-like members are spaced apart from and located above the vehicle roof with a gap defined therebetween.

SUMMARY

One object of the present disclosure is to provide a vehicle with roof rails that are flush or nearly flush with the vehicle roof surface with no gap between the roof rail and the roof surface.

Another object of the present disclosure is to provide a vehicle with roof rails that include concealed roof accessory supporting structures that are easily exposed for use supporting vehicle roof accessories such as, for example, a cartop carrier or a ski rack.

In view of the state of the known technology, one aspect of the present disclosure is to provide a vehicle roof rail assembly with a roof rail and a bracket. The roof rail is fixedly attached to the roof of a vehicle. The roof rail has a recessed portion with fastener receiving portions located therein. The bracket has an attachment flange and an accessory supporting flange rigidly fixedly attached to the attachment flange. The attachment flange is removably attached to the roof rail via first fastener members that are removably fixed to the fastener receiving portions. The attachment flange overlays a section of the recessed portion the roof rail. The accessory supporting flange has an opening defined therein for attachment of roof accessory retaining elements.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
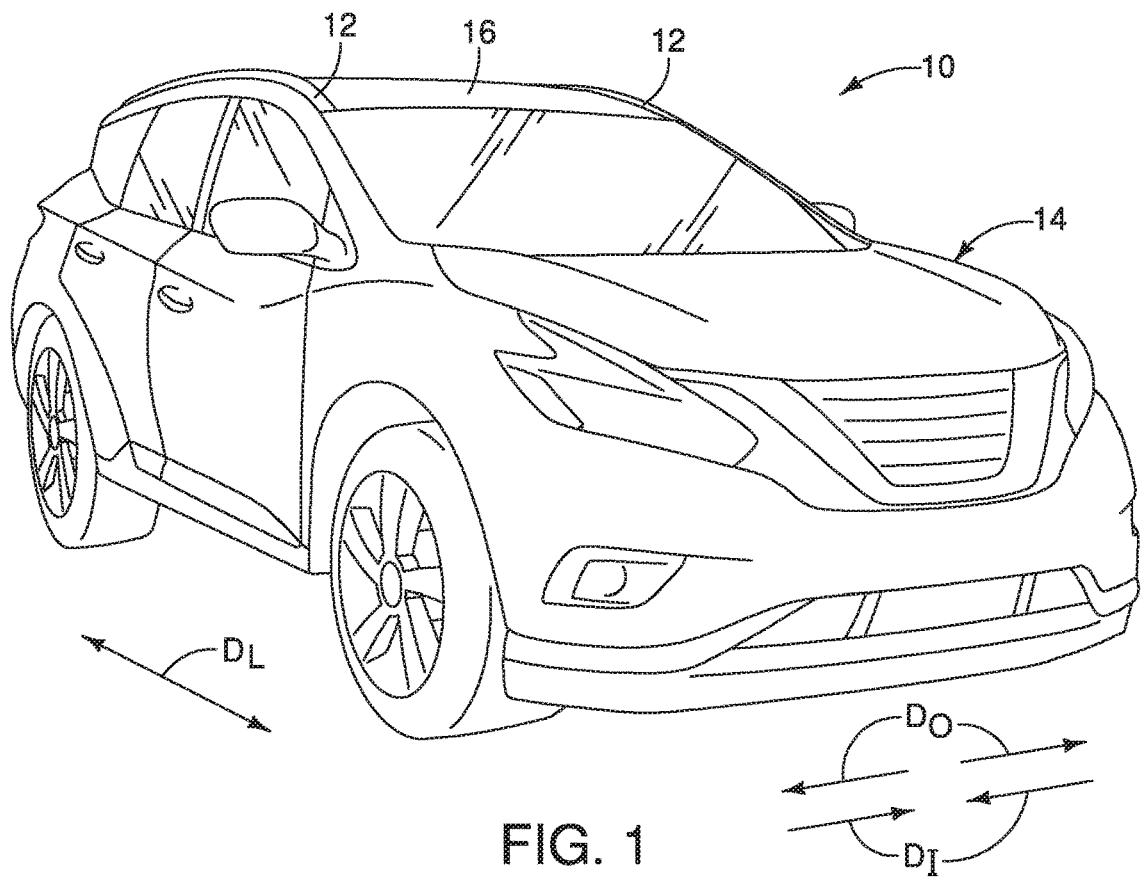
FIG. 1 is a perspective view of a vehicle showing a roof structure that includes roof rail assemblies in accordance with a first embodiment.
Figure 2:
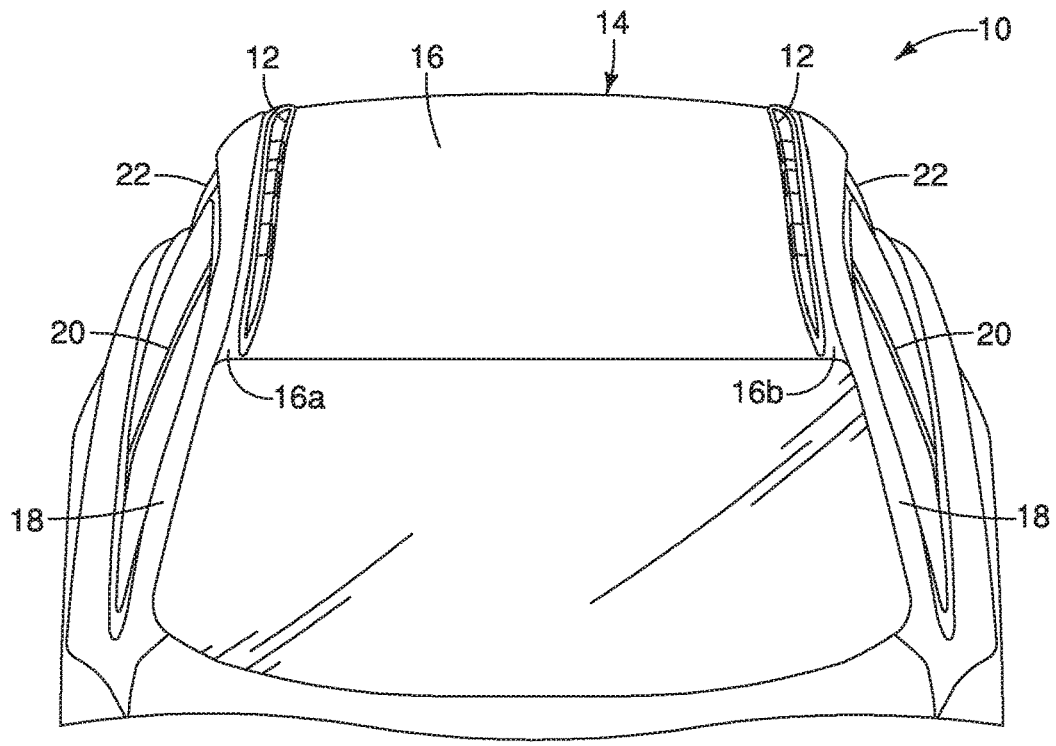
FIG. 2 is another perspective view of the roof structure of the vehicle showing the roof rail assemblies in accordance with the first embodiment.

Referring initially to FIGS. 1 and 2, a vehicle 10 having roof rail assemblies 12 is illustrated in accordance with a first embodiment.

The vehicle 10 defines a plurality of conventional directions, such as a vehicle longitudinal direction $D_L$, inboard direction $D_I$ and outboard direction $D_O$. The inboard direction $D_I$ and outboard direction $D_O$ are defined relative to an imaginary center line of the vehicle 10 that extends in the longitudinal direction $D_L$ through a longitudinal center of the vehicle 10. Specifically, the inboard direction $D_I$ corresponds to directions that are directed from outboard of either lateral side of the vehicle 10 toward the imaginary centerline of the vehicle 10. Similarly, the outboard direction $D_O$ corresponds to directions that are directed from the imaginary centerline of the vehicle 10 toward either outboard lateral side of the vehicle 10. Further, the inboard direction $D_I$ and outboard direction $D_O$ are generally considered to be perpendicular to the vehicle longitudinal direction $D_L$ but can alternatively be angularly offset from perpendicular by an acute angle. In the description below, the inboard direction $D_I$ and outboard direction $D_O$ are considered to be perpendicular to the vehicle longitudinal direction $D_L$. However, the inboard direction $D_I$ and outboard direction $D_O$ can be angularly offset from perpendicular by an angle that is between approximately 0 and 30 degrees from perpendicular.

The vehicle 10 basically includes, among other structural elements and components, a vehicle body structure 14 that includes a roof structure 16, A-pillars 18, B-pillars 20 and C-pillars 22. The roof structure 16 is supported by other structural elements (not shown) by the A-pillars 18, the B-pillars 20 and the C-pillars 22 in a conventional manner. Since vehicle body structures such as roof structure, A-pillars, B-pillars, C-pillars, and roof ditches are conventional structures, further description is omitted for the sake of brevity.

Figure 9:
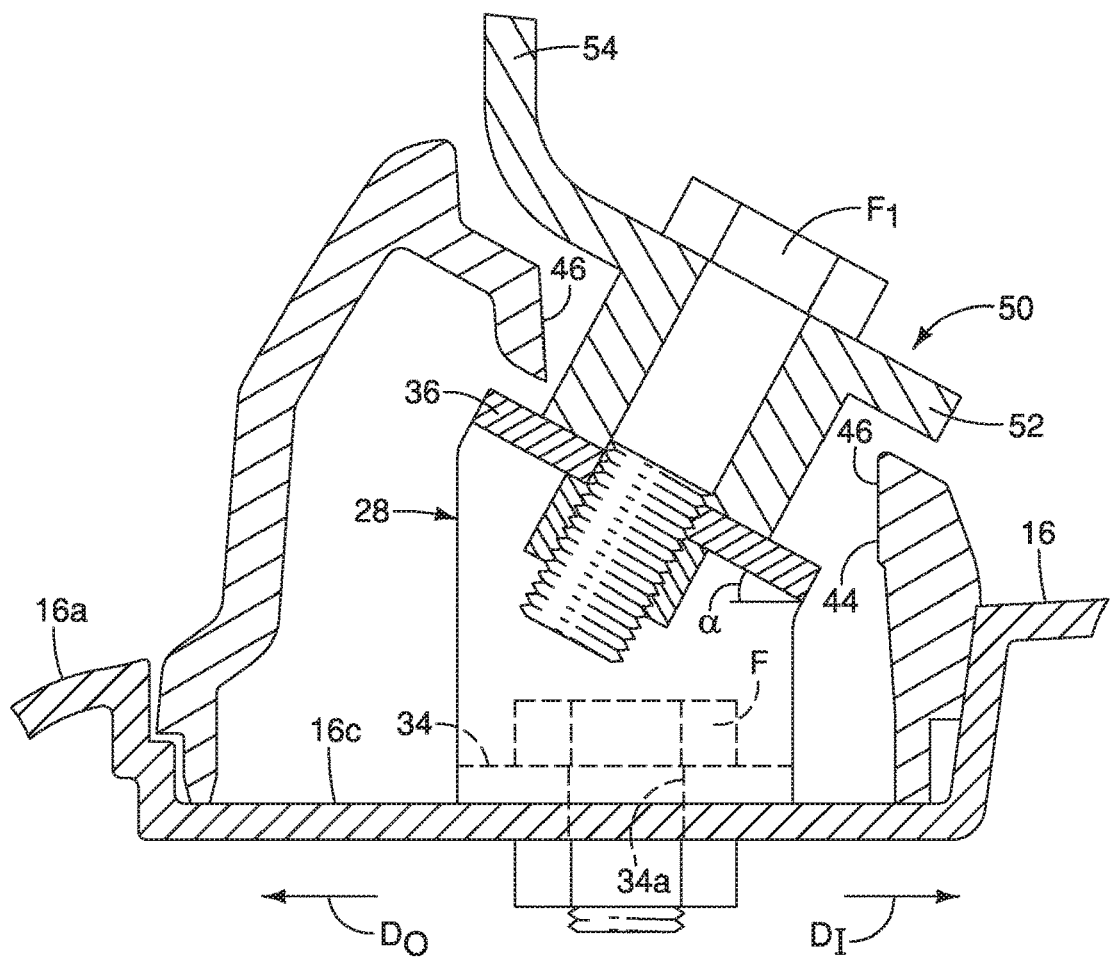
FIG. 9 is a cross-sectional view of the roof rail structure with the accessory bracket installed to the attachment section taken along the line 9-9 in FIG. 8, showing one of the alignment projections positioned between alignment surfaces of an alignment concaved area of the recessed portion of the elongated rail in accordance with the first embodiment.

The roof structure 16 includes a plurality of bows (not shown) and side roof rails (not shown) and defines two conventional roof ditches 16c (one of the roof ditches 16c is shown in FIG. 9). The roof rail assemblies 12 are installed to the roof structure 16, concealing the roof ditches 16c (FIG. 9). The roof rail assemblies 12 (and the roof ditches 16c) extend in the vehicle longitudinal direction $D_L$ along respective outboard areas 16a and 16b of the roof structure 16. The roof rail assemblies 12 are low profile roof rails that project upward above adjacent surfaces of the roof structure 16 by a relatively small dimension of, for example, an inch or two.

As shown in FIGS. 1 and 2, the vehicle 10 includes two roof rail assemblies 12. The two roof rail assemblies 12 are structurally identical and are the same, except that they are symmetrical mirror images of one another. For the sake of brevity, only one roof rail assembly 12 is described herein below. The description of the roof rail assembly 12 below applies equally to both roof rail assemblies 12.

As shown in FIGS. 2 through 5, the roof rail assembly 12 includes a roof accessary supporting structure 28, an elongated rail 30 (FIGS. 2-5) and three removable covers 32.

Figure 5:
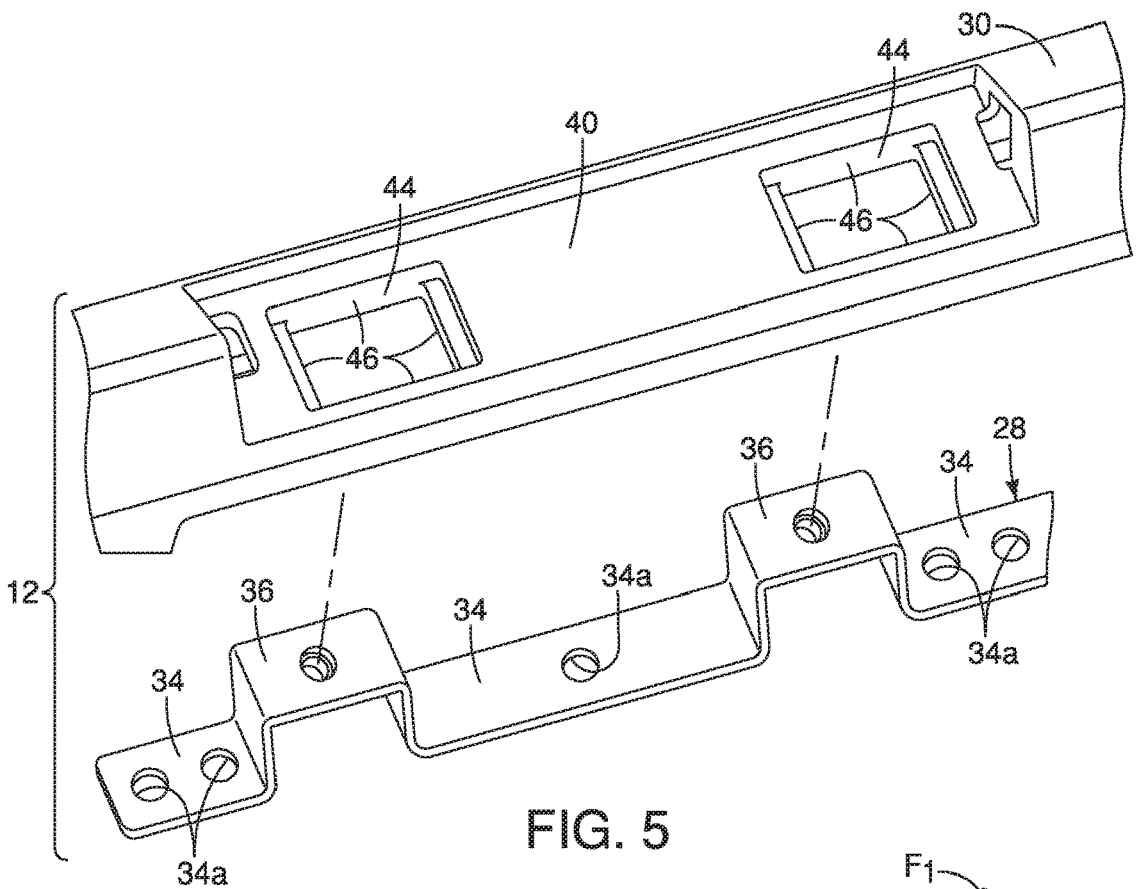
FIG. 5 is an exploded view of the roof rail structure showing a roof accessary supporting structure and an elongated rail, the elongated rail otherwise at least partially concealing by the roof accessary supporting structure in accordance with the first embodiment.

The roof accessary supporting structure 28 and the elongated rail 30 can be constructed as a single element, or can be two separate elements, as shown in FIG. 5. For example, the roof accessary supporting structure 28 can be a metallic flat bar bent, forged, deformed or otherwise worked into the depicted shape. Specifically, the roof accessary supporting structure 28 includes attachment sections 34 and fastener receiving portions 36. The attachment sections 34 can include fastener receiving openings 34a that receive attachment fasteners F (FIG. 9) that secure roof accessary supporting structure 28 to the roof structure 16 of the vehicle 10. The fastener receiving portion 36 are spaced apart vertically above the attachment sections 34, and, are further angularly offset from the attachment sections 34 by an angle α, as shown in FIG. 9. The angle α can be any angle between 15 and 45 degrees. However, in the depicted embodiment, the angle α is approximately 20 degrees.

Alternatively, the roof accessary supporting structure 28 can be part of the roof structure 16 within the roof ditch 16c. For example, the roof accessary supporting structure 28 can be welded to a surface or surfaces of the roof ditch 16c or can be part of a roof rail (not shown) that supports the roof structure 16.

The elongated rail 30 (a roof rail) can be a trim panel that extends the length of the roof ditch 16c, covering the roof ditch 16c and the roof accessary supporting structure 28. The elongated rail 30 is formed of a plastic or polymer material and includes a plurality of attachment structures, including snap fitting projections that engage corresponding recesses (not shown) in the surfaces that define the roof ditch 16c, mechanical fasteners, such as threaded bolts, that retain the elongated rail 30 within the roof ditch 16c in a conventional manner. The attachment structures of the elongated rail 30 can also be shaped and configured to engage and attach to portions of the roof accessory supporting structures 28, in a conventional manner.

The elongated rail 30 includes three recessed portions 40 concealed by covers 32, as shown in FIG. 2. However, in FIGS. 3-11 only one recessed portion 40 is depicted and described herein for the sake of brevity. The description of one of the recessed portions 40 applies to all of the recessed portions 40.

The recessed portion 40 is basically a compartment defined within the elongated rail 30 that includes two alignment concaved areas 44 surrounded by alignment surfaces 46. Further, each of the concaved areas 44 has an opening at a lower end thereof such that a corresponding one of the fastener receiving portions 36 is exposed. The elongated rail 30 and the roof accessory supporting structure 28 are installed to and within the roof ditch 16c. The fastener receiving portions 36 of the roof accessory supporting structure 28 are aligned with, visible and accessed through the concaved areas 44. As shown in FIGS. 4, 5, 6 and 9, the alignment surfaces 46 surround the opening at the lower end of the concaved areas 44.

Figure 3:
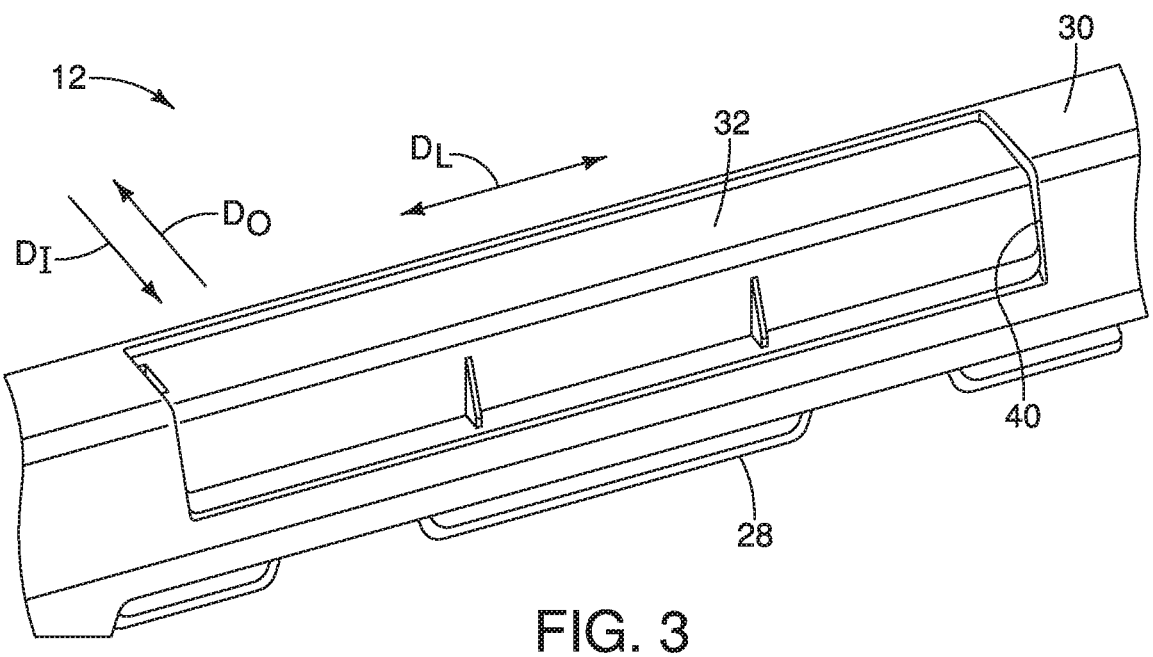
FIG. 3 is a perspective view of one of the roof rail structures removed from the roof structure showing the roof rail structure and one of a plurality of removable covers concealing a recessed portion of the roof rail in accordance with the first embodiment.
Figure 4:
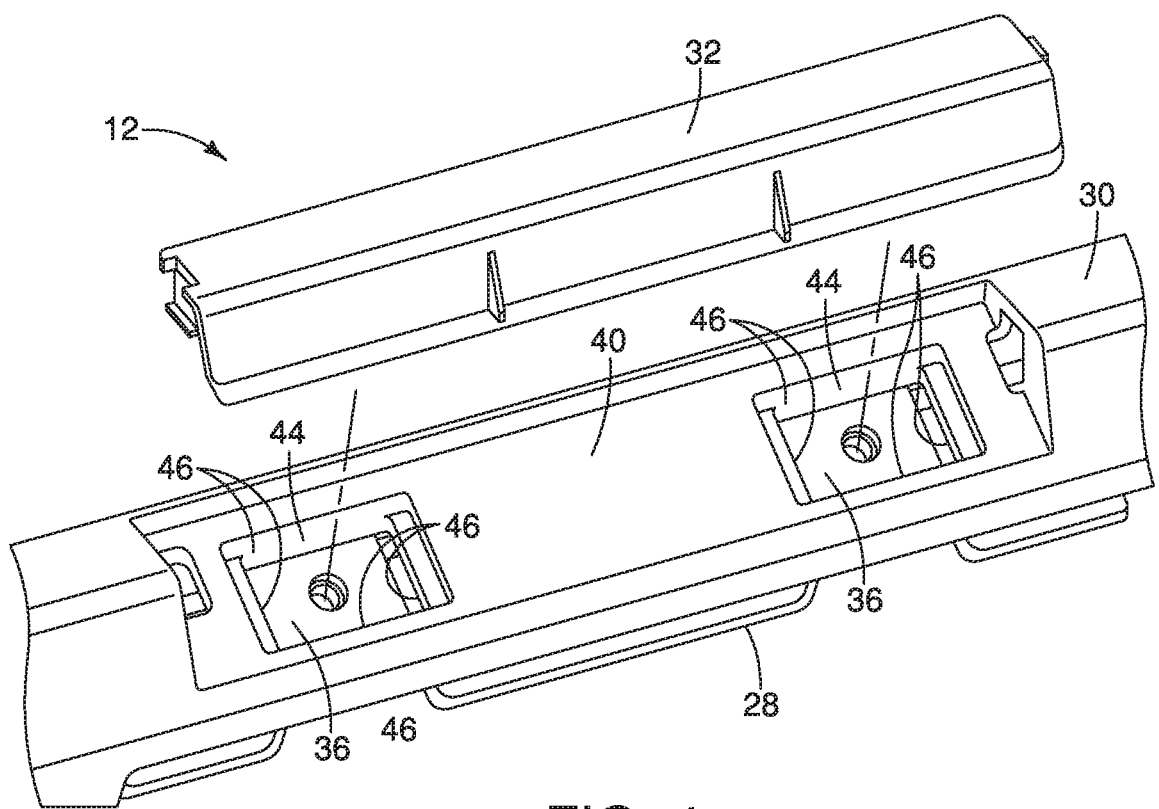
FIG. 4 is an exploded perspective view of the roof rail structure shown in FIG. 3, showing the removable cover removed from the roof rail structure revealing the recessed portion of the roof rail, two alignment concaved area in accordance with the first embodiment.

As shown in FIG. 3, the recessed portion 40 of the elongated rail 30 is dimensioned to receive one of the removable covers 32. Each of the removable covers 32 includes snap fitting projections (not shown) that engage surfaces within the recessed portion 40 thereby releaseably retaining the cover 32 in position. Alternatively, the covers 32 can be retained in position to the elongated rail 30 via mechanical fasteners.

Figure 6:
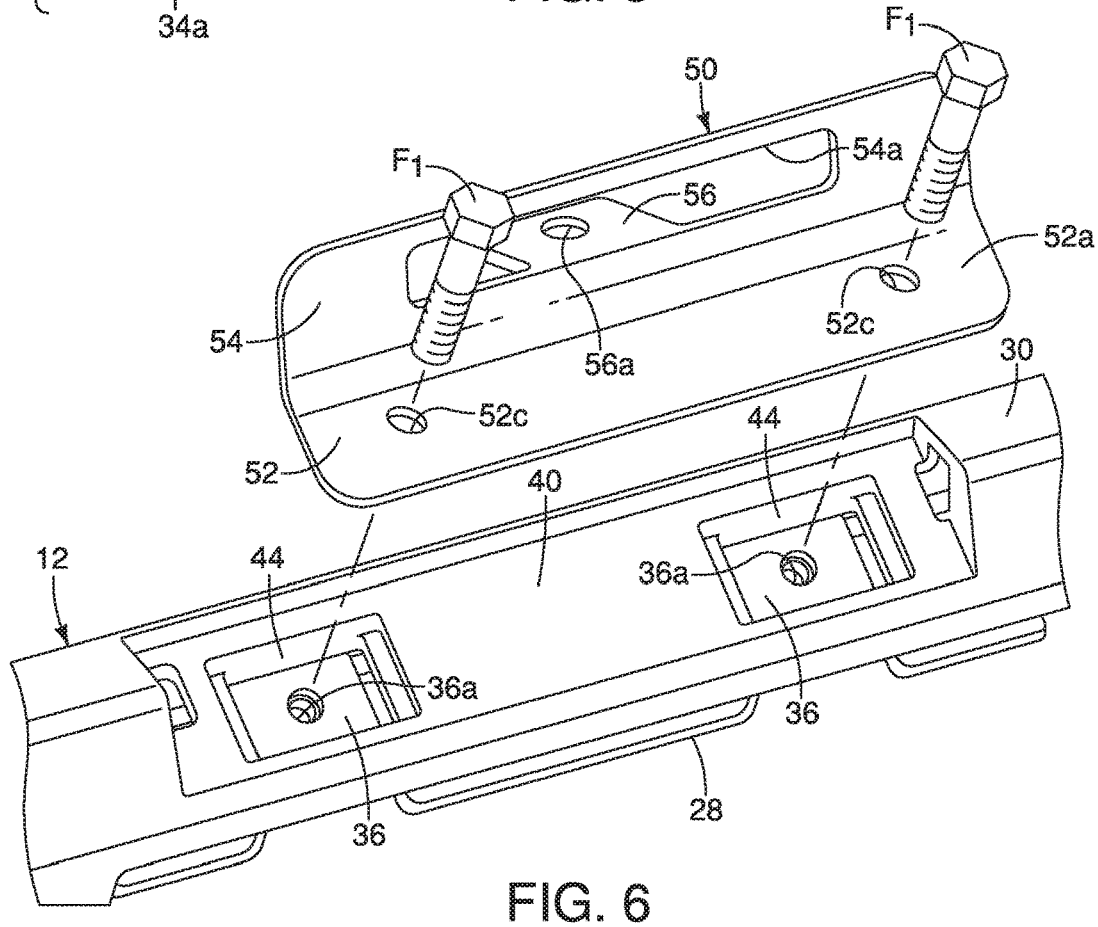
FIG. 6 is another exploded perspective view of the roof rail structure with the cover removed showing the elongated rail at least partially concealing the roof accessary supporting structure, and further showing an accessory bracket that attaches to attachment sections of the roof accessory supporting structures with first fasteners fixedly attaching the accessory bracket to the roof accessory supporting structure in accordance with the first embodiment.

With the cover 32 removed from the roof rail assembly 12, the recessed portion 40, along with the fastener receiving portions 36 are exposed, as shown in FIG. 6. An accessory bracket 50 can be installed to the fastener receiving portions 36, as described further below.

As shown in FIGS. 6-9, the accessory bracket 50 (also referred to as the bracket 50) includes an attachment flange 52, a first accessory supporting flange 54 and a second accessory supporting flange 56. The attachment flange 52, the first accessory supporting flange 54 and the second accessory supporting flange 56 are preferably made from a single thick sheet of metal, such a steel, but can alternatively be made of separate plates welded together.

Figure 7:
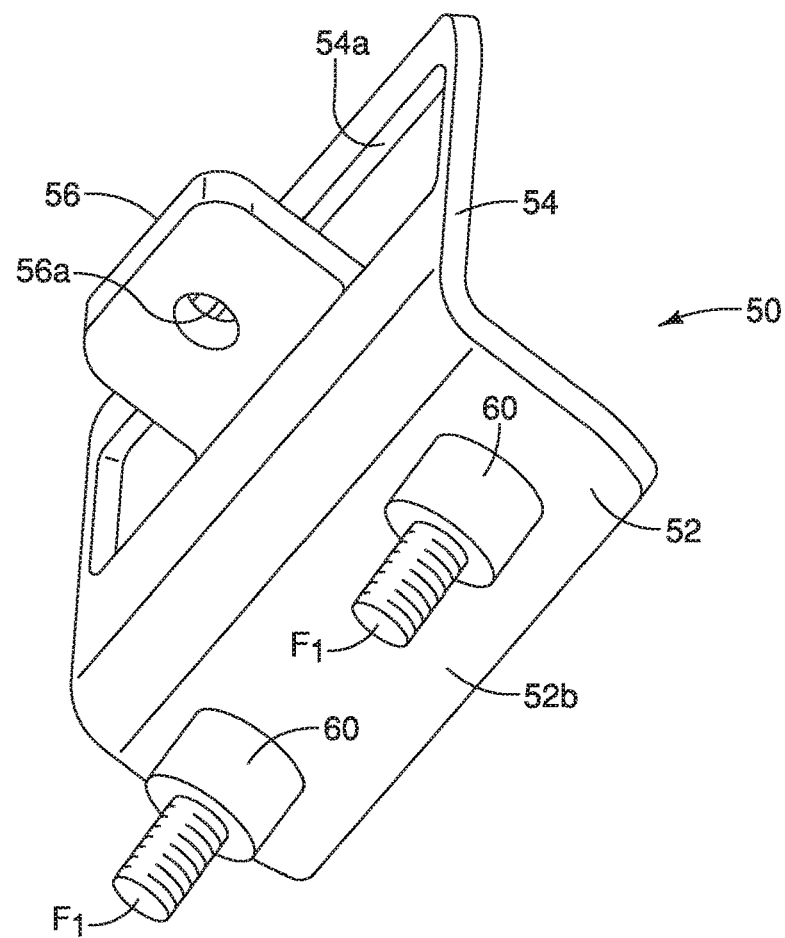
FIG. 7 is a perspective view of the accessory bracket removed from the roof rail assembly showing an attachment flange with alignment projections on a downwardly facing surface thereof, a first accessory supporting flange and a second accessory supporting flange in accordance with the first embodiment.
Figure 8:
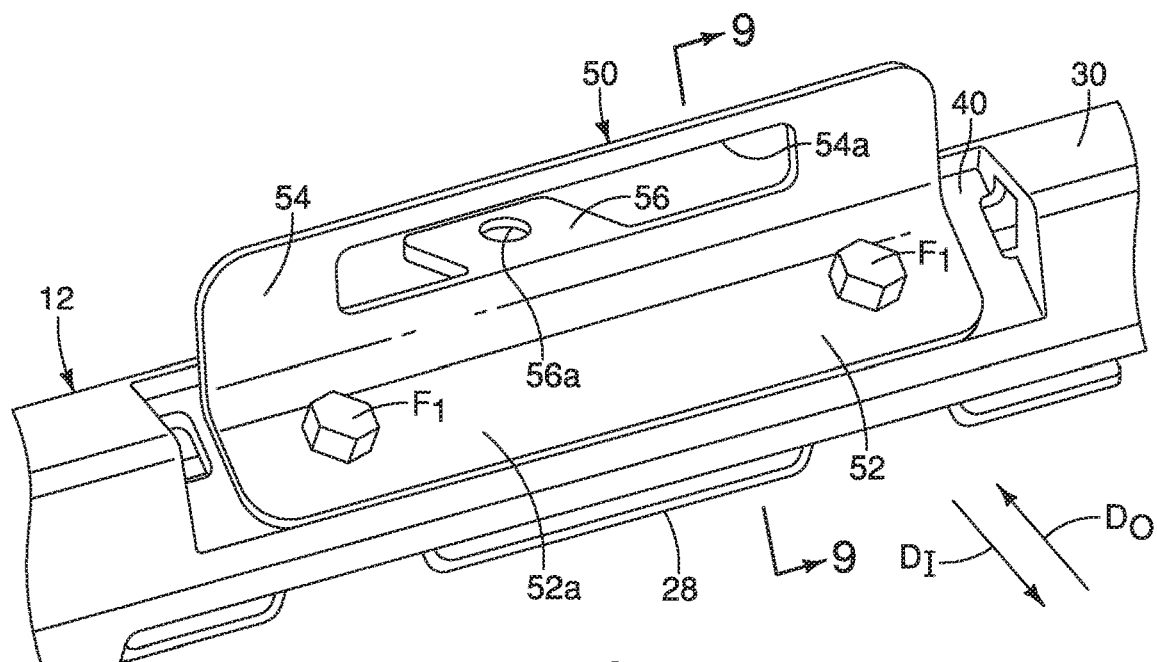
FIG. 8 is another perspective view of the roof rail structure showing the accessory bracket attached to the attachment sections of the roof accessory supporting structure in accordance with the first embodiment.

The attachment flange 52 has an upwardly facing surface 52a (FIG. 8) and a downwardly facing surface 52b (FIG. 7). The downwardly facing surface 52 has at least one alignment projection 60, and preferably two alignment projections 60. The alignment projections 60 in the depicted embodiment are cylindrically shaped formations dimensioned to fit into corresponding ones of the alignment concaved areas 44. When inserted into the alignment concaved areas 44, the alignment projections 60 are located centrally within the alignment concaved area 44, as shown in FIG. 9. As such, the attachment flange 52 aligns within the recessed portion 40 of the roof rail 30 during installation. The alignment projections 60 and the attachment flange 52 include coaxial openings extending therethrough, dimensioned to receive first fasteners $F_1$ that thread into corresponding threaded openings in the fastener receiving portions 36 of the roof accessory supporting structure 28. Once the first fasteners $F_1$ are tightened, the attachment flange 52 (and the accessory bracket 50) is securely fixed to the roof accessory supporting structures 28 and hence the roof structure 16, as shown in FIGS. 8 and 9. With the accessory bracket 50 installed to the roof rail assembly 12, the attachment flange 52 overlays a section (the majority) of the recessed portion 40 the roof rail 30.

The fasteners $F_1$ are designed for repeated installation and removal, such that the accessory bracket 50 can be installed and removed from the roof rail assembly 12 with relative ease, and the covers 32 can be easily re-installed with the accessory bracket 50 removed.

Figure 10:
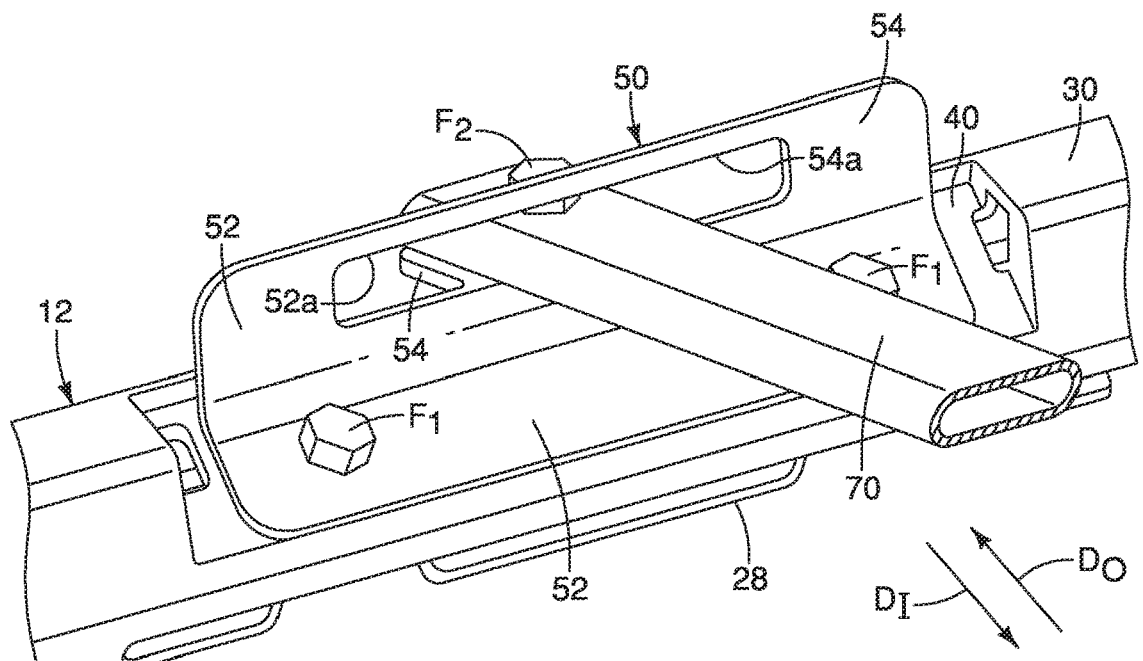
FIG. 10 is another perspective view of the roof rail structure showing the accessory bracket attached to the attachment sections of the roof accessory supporting structure and a cargo bar attached to the second accessory supporting flange in accordance with the first embodiment.
Figure 11:
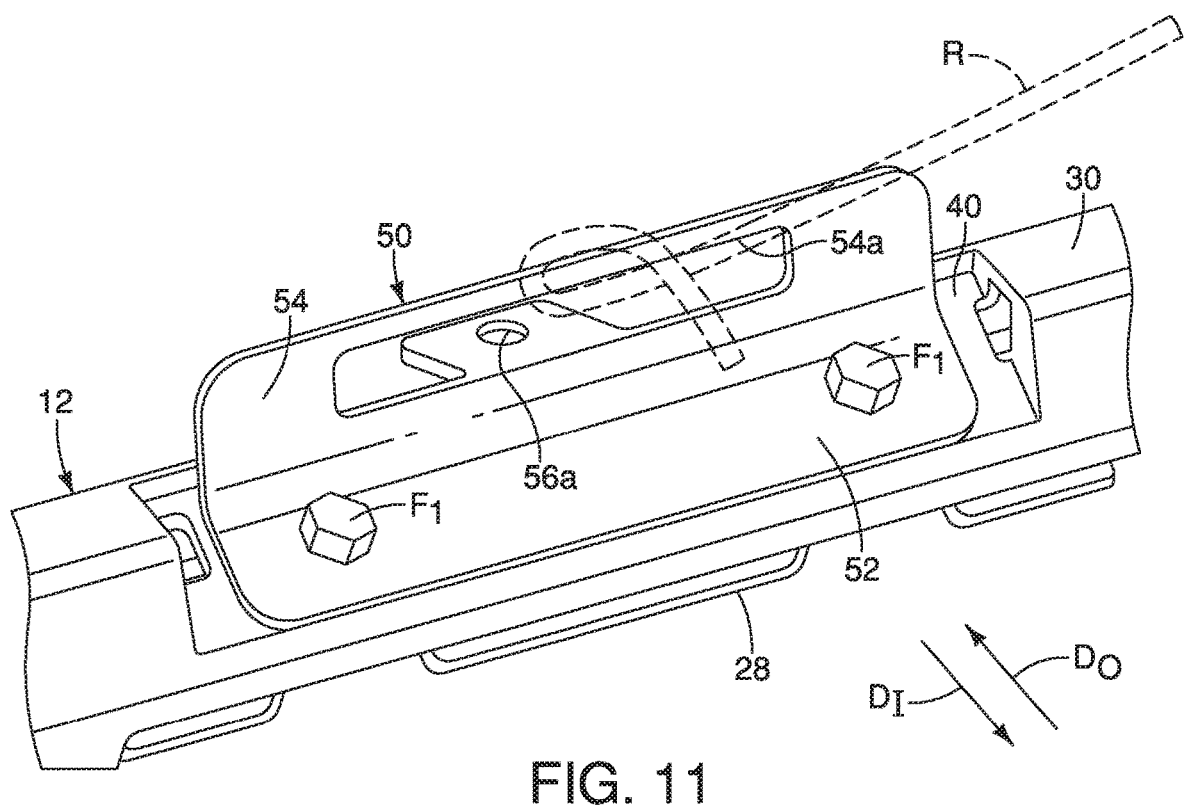
FIG. 11 is another perspective view of the roof rail structure showing the accessory bracket attached to the attachment sections of the roof accessory supporting structure and rope attached to the first accessory supporting flange in accordance with the first embodiment.

As mentioned above, the accessory bracket 50 includes the first accessory supporting flange 54 and the second accessory supporting flange 56. The first accessory supporting flange 54 extends vertically upward from the attachment flange 34. More specifically, the first accessory supporting angle is perpendicular to the bottom surface of the roof ditch 16c, as indicated in FIG. 9. The first accessory supporting flange 54 includes an elongated slot 54a formed therein, as shown in FIGS. 10 and 11. The elongated slot 54a extends in the vehicle longitudinal direction $D_L$, and, is configured to serve as an attachment location for roof accessory retaining elements. For example, as shown in FIG. 11, a strap or rope R can be attached to the accessory bracket 50 by looping the rope R (or strap) through the elongated slot 54a and around an upper portion of the first accessory supporting flange 54. The strap or rope R can be part of a conventional canvas cartop carrier (not shown) that lies direction on the upper surface of the roof structure 16.

The second accessory supporting flange 56 of the accessory bracket 50 extends horizontally and parallel to the lower surface of the roof ditch 16c. Further, the second accessory supporting flange 56 extends in the outboard direction $D_O$ from the first accessory supporting flange 54, as shown in FIGS. 8 and 10. The second accessory supporting flange 56 includes a threaded opening 56a configured to retain a second fastener $F_2$ that is located for attachment of roof accessory retaining elements, such as a cargo bar 70. The cargo bar 70 removably attaches to the second cargo supporting flange 56 via the second fastener $F_2$. The cargo bar extends in a side-to-side lateral direction relative to the vehicle 10 from one of the roof rail assemblies 12 to the other of the roof rail assemblies 12. The cargo bar 70 extends through the elongated slot 54a to the second accessory supporting flange 56. The cargo bar 70 can support, for example, a conventional rigid cartop carrier (not shown), a conventional ski rack (not shown), a conventional bicycle rack (not shown), or other conventional cargo retaining structure.

Conventional roof rail assemblies typically extend several inches above the upper surface of the roof structure 16 (i.e., 4-6 inches above roof). Gaps are defined between portions of the conventional roof rail assembly and the roof structure that make it possible to attach of cargo supporting structures to the vehicle 10.

Since the above described roof rail assembly 12 is either flush with, or extends only a small distance above the roof structure 16, the overall design and shape of the vehicle 10 is attractive and more aerodynamic without a loose in functionality with respect to cargo retaining capability.

Second Embodiment

Figure 12:
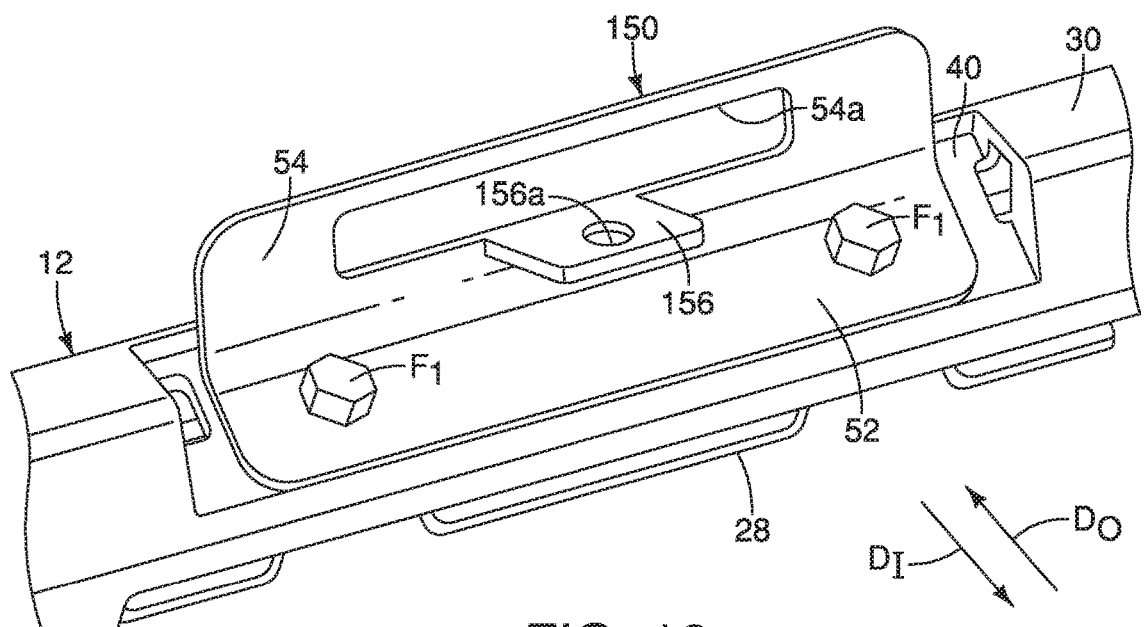
FIG. 12 is a perspective view of the roof rail structure showing an accessory bracket attached to the attachment sections of the roof accessory supporting structure in accordance with a second embodiment.

Referring now to FIG. 12, an accessory bracket 150 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The accessory bracket 150 includes the attachment flange 52 and the first accessory supporting flange 54, as described above with respect to the first embodiment. The accessory bracket 150 attaches to the roof accessary supporting structure 28 within the recessed portion 40 of the elongated rail 30. However, in the second embodiment, the second accessory supporting flange 56 has been replaced with a second accessory supporting flange 156 that extends in the inboard direction $D_I$ from the first accessory supporting flange 54.

Third Embodiment

Figure 13:
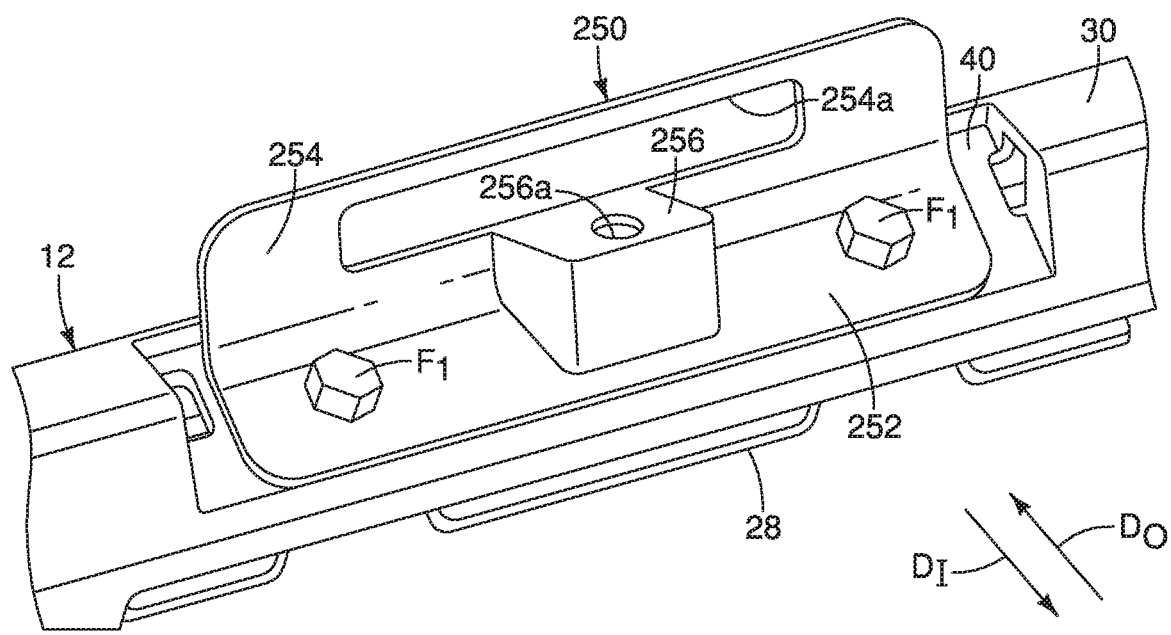
FIG. 13 is a perspective view of the roof rail structure showing an accessory bracket attached to the attachment sections of the roof accessory supporting structure in accordance with a third embodiment.

Referring now to FIG. 13, an accessory bracket 250 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The accessory bracket 250 includes an attachment flange 252, a first accessory supporting flange 254 and a second accessory supporting flange 256. The attachment flange 252, as compared to the attachment flange 52, is identical to the attachment flange 52 of the first embodiment, except that the attachment flange 252 has been modified such that the second accessory supporting flange 256 includes supporting walls that extend upward from the attachment flange 252. The first accessory supporting flange 254, as compared to the first accessory supporting flange 54 of the first embodiment, is identical to the first accessory supporting flange 54 of the first embodiment, except that the first accessory supporting flange 254 has been modified such that the second accessory supporting flange 256 extends in the inboard direction $D_I$. Further, the second accessory supporting flange 256 is located inboard of the first accessory supporting flange 254 and is supported by the attachment flange 252. The second accessory supporting flange 256 is a cargo supporting structure and includes a threaded opening 256a that can support the cargo bar 70 (not shown in FIG. 12) and the second fastener $F_2$ (not shown in FIG. 12).

The second accessory supporting flange 256 also extends upward from the attachment flange 252 to a lower end of the opening or elongated slot 254a of the first accessory supporting flange 264. The upper surface of the second accessory supporting flange 256 extends horizontally relative to the roof structure 16.

The various vehicle elements and components of the vehicle 10 (other than the roof rail assembly 12) are conventional components that are well known in the art. Since vehicle elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle roof rail assembly. Accordingly, these terms, as utilized to describe the present invention should be interpreted relative to a vehicle equipped with the vehicle roof rail assembly.

The term "configured" as used herein to describe a component, section or part of a structure includes elements that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle roof rail assembly, comprising:
    a supporting structure having a plurality of attachment sections and a plurality of fastener receiving portions, each of the fastener receiving portions being located between two of the plurality of attachment sections, the attachment sections being attached to the roof of a vehicle;
    a roof rail also fixedly attached to the roof of the vehicle, the roof rail having a recessed portion that is dimensioned and shaped to cover and conceal all of the plurality the attachment sections of the supporting structure that extend beneath the recessed portion including one of the plurality of attachment sections that is located between an adjacent pair of the plurality of fastener receiving portions, the recessed portion being further dimensioned and shaped to expose the adjacent pair of the plurality of fastener receiving portions of the supporting structure; and
    a bracket having an attachment flange and an accessory supporting flange fixedly attached to the attachment flange, the attachment flange having an upwardly facing surface and a downwardly facing surface, the downwardly facing surface having alignment projections and fastener openings co-axially aligned with corresponding ones of the alignment projections, the attachment flange being removably attached to the adjacent pair of the plurality of fastener receiving portions of the supporting structure exposed within the recessed portion via first fastener members that extend into corresponding ones of the fastener openings and through the alignment projections such that the first fastener members are removably attached to the adjacent pair of the plurality of fastener receiving portions, the attachment flange overlaying a section of the recessed portion the roof rail and extending between the adjacent pair of the plurality of fastener receiving portions, the accessory supporting flange having an opening defined therein for attachment of roof accessory retaining elements, the recessed portion of the roof rail including two alignment concaved areas dimensioned to receive the alignment projections such that the attachment flange aligns with the adjacent pair of the plurality of fastener receiving portions exposed at the lower ends of the two alignment concaved areas of the recessed portion of the roof rail during installation.

2. The vehicle roof rail assembly according to claim 1, further comprising
    a removable cover that removably attaches to the roof rail and when attached to the roof rail is dimensioned to cover and conceal the recessed portion of the roof rail with the bracket removed from the roof rail.

3. The vehicle roof rail assembly according to claim 1, wherein
    the accessory supporting flange extends upwardly from the attachment flange of the bracket, the accessory supporting flange having an opening formed therein.

4. The vehicle roof rail assembly according to claim 3, wherein
    the opening in the accessory supporting flange is an elongated slot that extends in a vehicle longitudinal direction.

5. The vehicle roof rail assembly according to claim 3, wherein
    the bracket further includes a second accessory supporting flange that extends horizontally from the attachment flange of the bracket, the second accessory supporting flange having an opening formed therein.

6. The vehicle roof rail assembly according to claim 5, further comprising
    a cargo bar removably attached to the second cargo supporting flange via a mechanical fastener, the cargo bar extending in a side-to-side lateral direction relative to the vehicle.

7. The vehicle roof rail assembly according to claim 5, wherein
the second accessory supporting flange extends from the attachment flange at a lower end of the opening in the cargo supporting flange.

8. The vehicle roof rail assembly according to claim 3, wherein
the bracket further includes a cargo supporting structure that is located on an inboard side of the accessory supporting flange and extends inboard therefrom, the cargo supporting structure having an opening formed therein.

9. The vehicle roof rail assembly according to claim 8, further comprising
a cargo bar removably attached to the second cargo supporting flange via a mechanical fastener, the cargo bar extending in a side-to-side lateral direction relative to the vehicle.

10. The vehicle roof rail assembly according to claim 1, wherein
the accessory supporting flange extends horizontally from the attachment flange of the bracket in an outboard direction, the accessory supporting flange having an opening formed therein.

11. The vehicle roof rail assembly according to claim 10, further comprising
a cargo bar removably attached to the cargo supporting flange via a mechanical fastener, the cargo bar extending in a side-to-side lateral direction relative to the vehicle.

12. The vehicle roof rail assembly according to claim 1, wherein
the plurality of fastener receiving portions are spaced apart vertically above the plurality of attachment sections and are further angularly offset from the attachment sections by any angle between 15 and 45 degrees.

13. The vehicle roof rail assembly according to claim 12, wherein
the angle is approximately 20 degrees.

14. The vehicle roof rail assembly according to claim 1, wherein
the attachment flange and the accessory supporting flange are angularly offset from one another by an obtuse angle.

15. A vehicle roof rail assembly, comprising
a supporting structure having a plurality of attachment sections and a plurality of fastener receiving portions, each of the fastener receiving portions being located between two of the plurality of attachment sections, the attachment sections being attached to the roof of a vehicle;
a roof rail also fixedly attached to the roof of the vehicle, the roof rail having a recessed portion that is dimensioned and shaped to cover and conceal all of the plurality the attachment sections of the supporting structure that extend beneath the recessed portion including one of the plurality of attachment sections that is located between an adjacent pair of the plurality of fastener receiving portions, the recessed portion being further dimensioned and shaped to expose the adjacent pair of the plurality of fastener receiving portions of the supporting structure, the recessed portion of the roof rail including two alignment concaved areas; and
a bracket having an attachment flange and an accessory supporting flange fixedly attached to the attachment flange, the attachment flange having an upwardly facing surface and a downwardly facing surface, the downwardly facing surface having alignment projections and fastener openings co-axially aligned with corresponding ones of the alignment projections, the alignment projections being inserted into corresponding ones of the two alignment concaved areas, the two alignment concaved areas dimensioned to receive the alignment projections such that the attachment flange aligns with the adjacent pair of the plurality of fastener receiving portions exposed at the lower ends of the two alignment concaved areas of the recessed portion of the roof rail, the attachment flange being removably attached to the adjacent pair of the plurality of fastener receiving portions of the supporting structure exposed within the recessed portion via first fastener members that removably attached to of the plurality of fastener receiving portions, the first fastener members extending into corresponding ones of the fastener openings and through the alignment projections with the attachment flange overlaying a section of the recessed portion the roof rail and extending between the adjacent pair of the plurality of fastener receiving portions, the accessory supporting flange extending upwardly and having an elongated slot defined therein that extends in a vehicle longitudinal direction, the accessory supporting flange further having a second accessory supporting flange that extends horizontally from the attachment flange of the bracket in an outboard direction from a lower end of the elongated slot, the second accessory supporting flange having an opening formed therein for attachment of roof accessory retaining elements.

16. The vehicle roof rail assembly according to claim 15, wherein
a cargo bar removably attached to the cargo supporting flange via a mechanical fastener that extends through the opening of the second accessory supporting flange, the cargo bar extending in a side-to-side lateral direction relative to the vehicle.

* * * * *